Figure 4:
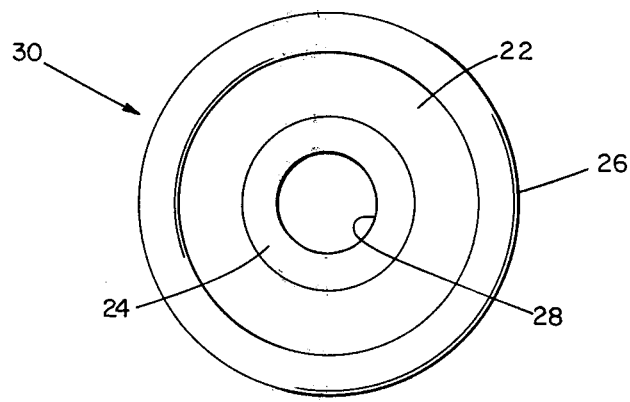

United States Patent [19]

Schieferstein et al.

[11] 4,197,875

[45] Apr. 15, 1980

[54] BALL CHECK VALVE

[75] Inventors: Robert J. Schieferstein, Reading, Pa.; Enrique L. Kilayko, Weston, Mass.

[73] Assignee: Liquid Metronics Incorporated, Waltham, Mass.

[21] Appl. No.: 906,582

[22] Filed: May 16, 1978

[51] Int. Cl.[2] .............................................. F16K 15/04
[52] U.S. Cl. ................................. 137/533.11; 137/539; 251/361
[58] Field of Search ................ 137/533.11, 539, 539.5; 251/361, 362, 363, 315

[56] References Cited

U.S. PATENT DOCUMENTS

| | | | |
|---|---|---|---|
| 2,329,087 | 9/1943 | Russell | 137/539 X |
| 2,525,799 | 10/1950 | Hecker | 251/363 X |
| 2,922,432 | 1/1960 | Hontington et al. | 137/539 X |
| 3,022,978 | 2/1962 | Kowalski et al. | 251/362 |
| 3,335,750 | 8/1967 | Kepner | 137/539 X |
| 4,006,883 | 2/1977 | Hilsheimer | 251/363 X |

*Primary Examiner*—William R. Cline

[57] ABSTRACT

A ball check valve is described having a fluid port, a ball moveable toward and away from the port, a seating surface surrounding the port and an elastomeric sealing element. The seating surface has a conical annular surface extending radially outwardly away from the ball and an annular ridge between the port and the conical surface. The sealing element has an outer sealing surface for contacting the conical seating surface and an annular groove for receiving the seating surface ridge. On its ball side, it has an annular outer surface and an inner sealing surface for contacting the ball. A sealing element retainer contacts the outer portion of the elastomeric sealing element outer surface on its ball side to hold it in position.

4 Claims, 8 Drawing Figures

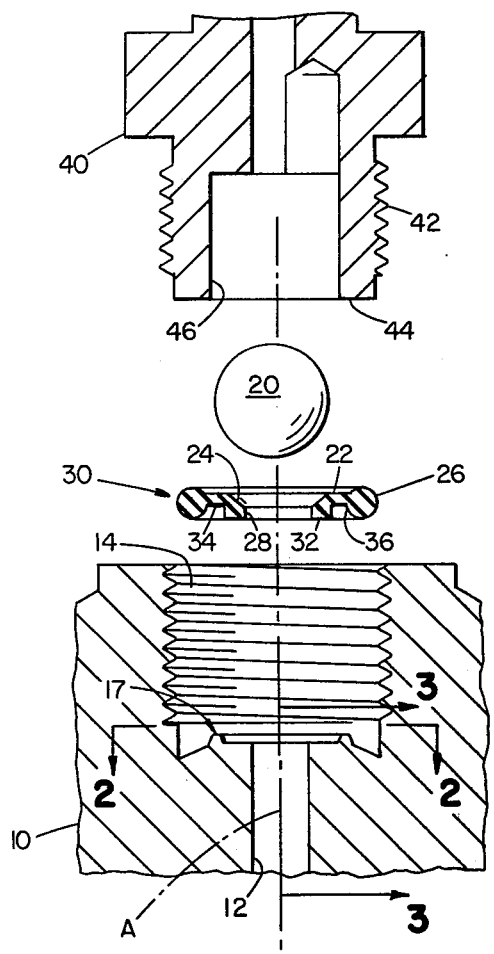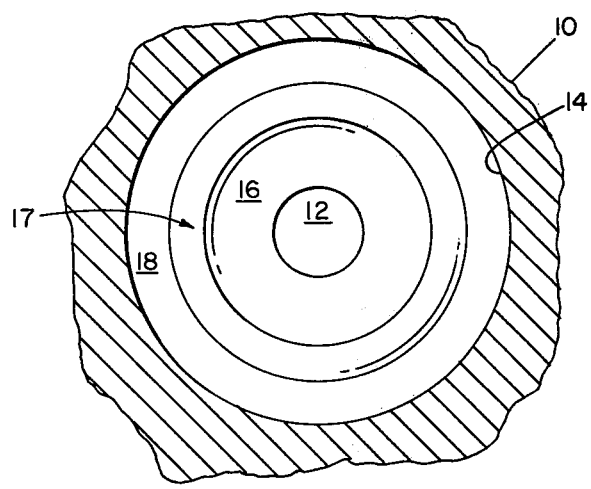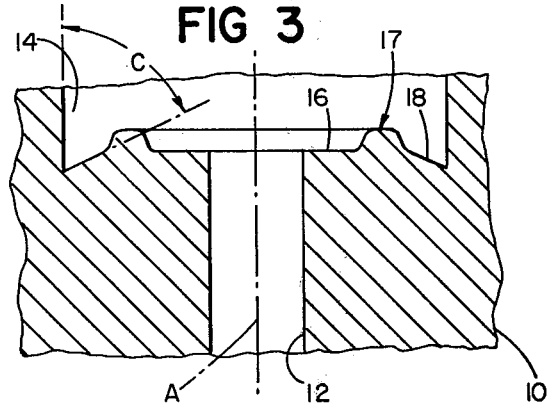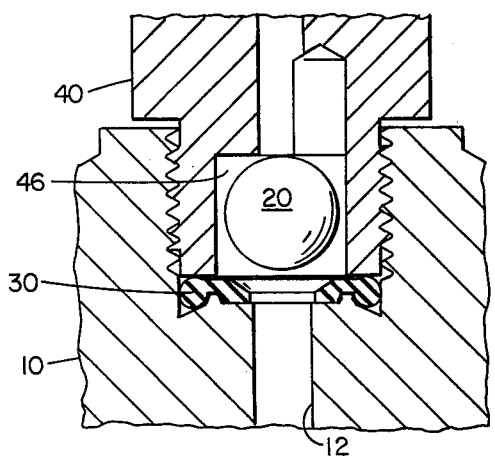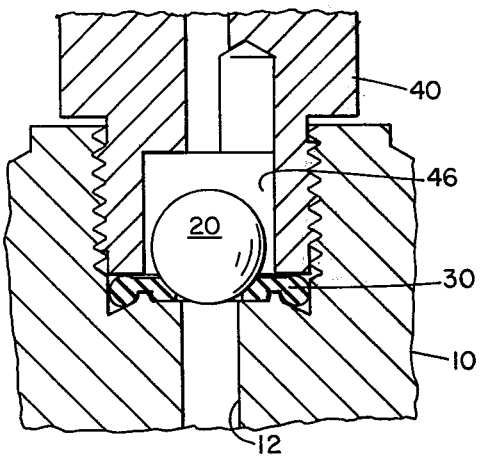

BALL CHECK VALVE

This invention relates to ball check valves, and, more particularly, to such valves having an elastomeric sealing element.

In check valves having relatively soft elastomeric sealing elements, the assembly for operation at high pressure has been a problem because distortion of the element may cause the ball contacting sealing surface to assume non-circular shape so that it no longer conforms to the surface of the rigid ball.

Accordingly, it is a major object of the present invention to provide a ball check valve having a relatively soft elastomeric sealing element in which the distortion of the ball contacting sealing surface under pressure is much reduced.

It is still another object of the invention to provide a ball check valve which will seal effectively at both low and high pressure.

It is a still further object of the invention to provide a highly effective ball check valve with a minimum number of parts which is simple and inexpensive to manufacture.

In general, the invention includes, in a ball check valve having a fluid port, a ball moveable toward and away from the port, a seating surface surrounding the port, an integral elastomeric sealing element having a central opening surrounding the port and positioned between the ball and the seating surface and, preferably, sealing element retaining means.

According to the invention, the seating surface has an outer generally conical annular surface extending radially outwardly away from the ball and a semicircular annular ridge between the port and the conical surface extending toward the ball, it may also have an inner generally flat annular surface surrounding the port.

The elastomeric sealing element, on its seating surface side, has an outer sealing surface for contacting the outer seating surface and an annular groove for receiving the ridge of the seating surface; it may also have an inner generally flat sealing surface surrounding its central bore for contacting the inner seating surface. On its ball side, the elastomeric sealing element preferably has an annular outer surface and an annular inner sealing surface surrounding the port for contact with the ball on movement of the ball toward the port.

The sealing element retaining means has an annular surface contacting at least the outer portion of the elastomeric sealing element outer surface on its ball side. The inner annular edge of the retaining means has a diameter greater than that of the ball and generally equal to or less than that of the ridge of the seating surface.

Figure 5:
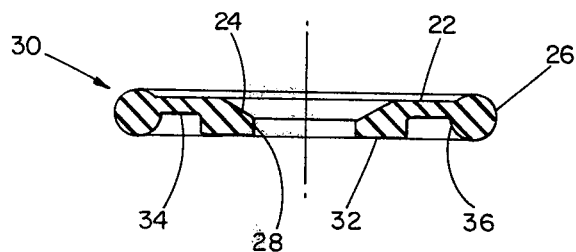
Figure 6:
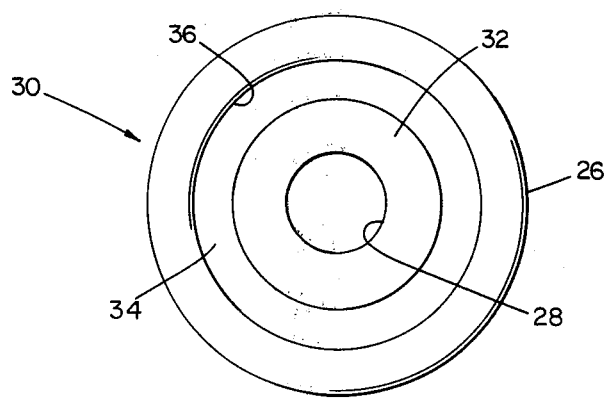

For the purpose of explaining the above and still further objects and features of the invention, reference is now made to the following detailed description of a preferred embodiment thereof, together with the accompanying drawings, wherein:

FIG. 1 is an exploded side sectional view of the ball check valve of the invention;

FIGS. 2 and 3 are, respectively, enlarged end and side sectional views of the seating surface of the valve of FIG. 1, taken on lines 2—2 and 3—3 thereof;

FIGS. 4, 5 and 6 are, respectively, a ball side view, a sectional view and a seating surface side view of the elastomeric sealing element of the valve of FIG. 1; and FIGS. 7 and 8 are, respectively, side sectional views of the valve of FIG. 1 in open and closed positions.

Referring to the drawings, the ball check valve of the present invention, in general, includes a base 10 having a fluid port 12 with a central axis A, a ball 20, substantially larger than the diameter of port 12, moveable toward and away from it, an integral elastomeric sealing element, generally designated 30, and a housing element, generally designated 40, having a ball receiving bore 46.

The novel sealing of the invention is provided by the configuration of the seating surfaces surrounding port 12, the configuration of the sealing surfaces of elastomeric sealing element 30, both on its seating surface and ball sides, and the sealing element retaining portion of housing element 40.

More specifically, base 10 has an inside threaded enlarged bore 14, concentric with the axis A of bore 12, for receiving the outside threaded portion 42 of housing 40 surrounding its ball receiving bore 46. Seating surfaces are provided at the bottom of enlarged bore 14 surrounding port 12. These seating surfaces, as best shown in FIGS. 2 and 3, include an inner, generally flat, annular surface 16 surrounding port 12 generally perpendicular to its axis A, an outer, generally conical, surface 18 extending radially outwardly at an angle away from ball 20 and a generally semicircular, rounded, annular ridge 17, of a diameter greater than that of ball 20 and extending toward it parallel to axis A. Conical annular surface 18 may be at an angle C of 60 to 75 degrees to axis A, preferably of about 66 degrees.

The integral elastomeric sealing element 30, shown in detail in FIGS. 4 through 6, is positioned at the bottom of bore 14 between its seating surfaces and ball 20, with its central opening 28 concentric with fluid port 12. As best shown in FIGS. 5 and 6, sealing element 30 has, on its seating surface side, an inner, generally flat, annular sealing surface 32, extending generally perpendicular to axis A, for contacting inner seating surface 16, an annular groove 34 for receiving annular ridge 17 and an outer annular sealing surface 36 on the outer circular bead portion 26 of sealing element 30 for contacting outer conical seating surface 18. On the ball side of elastomeric sealing element 30, as best shown in FIGS. 4 and 5, it has an annular, generally flat outer surface 22 generally perpendicular to axis A of port 12, slightly recessed within outer bead portion 26, and an inner, inwardly sloping, ball sealing surface 24 surrounding its central bore 28 and port 12 for contact with ball 20 on its movement toward port 12.

For retaining the elastomeric sealing element in position in contact with the seating surfaces, housing element 40 terminates in a flat annular surface 44, generally perpendicular to axis A, for contacting the outer bead portion 26 of sealing element 30 to retain it in position in enlarged bore 14. The diameter of the ball receiving bore 46 of housing 40, in addition to having a diameter substantially greater than that of ball 20 for free flow of fluid through the valve, has a diameter at least about equal to or somewhat less than that of seating surface ridge 17 for positive clamping of elastomeric sealing element 30 in assembled position, as shown in the valve open position in FIG. 7 and in the valve closed position in FIG. 8.

What is claimed is:

1. In a check valve having a port, sealing means comprising a ball moveable toward and away from said port along the axis thereof, said ball having a diameter substantially larger than the diameter of said port a rigid supporting surface surrounding said port, said supporting surface having an inner annular surface surrounding said port an outer annular surface extending radially outwardly at an angle away from said ball, and an annular ridge of rounded cross-section between said inner and outer supporting surfaces extending in a direction toward said ball an integral elastomeric sealing and ball seating element positioned between said ball and said supporting surface, said elastomeric element having a central cylindrical opening an outer annular sealing bead portion an inner annular surface in contact with said supporting surface an annular groove receiving said annular ridge, and an inner ball seating surface on the ball side of said elastomeric element surrounding said central opening, and retaining means spaced radially outwardly from said ball, said retaining means having an annular end surface overlapping at least a portion of said ridge and in pressure contact with said elastomeric element outer sealing bead portion for deformation of said bead portion to provide an effective outer fluid seal without substantial deformation of said inner ball seating surface.

2. In a check valve as claimed in claim 1, wherein said rigid supporting surface further has an annular outer bore extending from the outer peripheral edge of said outer annular surface in a direction toward said ball, and said retaining means is mounted within said outer bore for deformation of said sealing bead portion within the annular chamber formed by said end surface, said outer bore, said outer annular supporting surface and the outer side of said ridge.

3. In a check valve having a port, sealing means comprising a ball moveable toward and away from said port along the axis thereof, said ball having a diameter substantially larger than the diameter of said port a rigid supporting surface surrounding said port, said supporting surface having an inner generally flat annular surface surrounding said port generally perpendicular to the axis thereof an outer generally conical annular surface extending radially outwardly at an angle away from said ball an annular ridge of rounded cross-section between said flat and conical surfaces extending in a direction toward said ball, and an annular outer bore extending from the outer peripheral edge of said conical surface in a direction toward said ball parallel to the axis of said port an integral elastomeric sealing and ball seating element positioned between said ball and said supporting surface, said element having a central cylindrical opening having a diameter no less than that of said port an outer annular sealing bead portion of generally circular cross-section an inner generally flat annular surface in contact with said supporting surface an annular groove receiving said annular ridge, and an inner conical ball seating surface surrounding said central opening, and retaining means mounted within said outer bore spaced radially outwardly from said ball, said retaining means having an annular end surface overlapping at least a portion of said ridge and in pressure contact with said elastomeric element outer sealing bead portion for deformation of said bead portion within the annular chamber formed by said end surface, said outer bore, said conical surface and the outer side of said ridge to provide an effective outer fluid seal without substantial deformation of said inner conical ball seating surface.

4. In a check valve as claimed in claims 1, 2 or 3, wherein said retaining means is threadably mounted for rotary axial adjustment in said outer bore.

* * * * *